(12) United States Patent
Chen et al.

(10) Patent No.: US 10,740,966 B2
(45) Date of Patent: Aug. 11, 2020

(54) FAKE THICKNESS ON A TWO-DIMENSIONAL OBJECT

(71) Applicant: Microsoft Technology Licensing, LLC, Redmond, WA (US)

(72) Inventors: Tong Chen, Bellevue, WA (US); Christopher J. Matthews, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/147,504

(22) Filed: Sep. 28, 2018

(65) Prior Publication Data
US 2019/0347853 A1 Nov. 14, 2019

Related U.S. Application Data (60) Provisional application No. 62/671,332, filed on May 14, 2018.

(51) Int. Cl.
*G06T 17/10* (2006.01)
*G06T 19/00* (2011.01)
(Continued)

(52) U.S. Cl.
CPC ............ *G06T 17/10* (2013.01); *G06T 1/20* (2013.01); *G06T 15/005* (2013.01); *G06T 15/503* (2013.01); *G06T 19/006* (2013.01)

(58) Field of Classification Search
CPC ......... G06T 17/10; G06T 1/20; G06T 15/005; G06T 19/006; G06T 15/503; G06T 5/002; G06T 15/10; G06T 2207/10028; G06T 3/40; G06T 7/13; G06T 7/50; G06T 15/00; G06T 15/80; G06T 2200/12;
(Continued)

(56) References Cited

U.S. PATENT DOCUMENTS 7,999,807 B2 * 8/2011 Petschnigg ............. G06T 15/00
345/426
9,317,970 B2 4/2016 Beeler et al.
(Continued)

FOREIGN PATENT DOCUMENTS

WO 2016114930 A2 7/2016

OTHER PUBLICATIONS

Szirmay-Kalos et al., "Displacement Mapping on the GPU—State of the Art," Computer Graphics Forum, 27: 1567-1592, Sep. 20, 2008, doi:10.1111/j.1467-8659.2007.01108.x. (Year: 2008).*
(Continued)

*Primary Examiner* — Maurice L. McDowell, Jr.
*Assistant Examiner* — Donna J. Ricks (57) ABSTRACT

A system for generating an object in a mixed reality space obtains a two-dimensional (2D) object having a face with four vertices and determine a visibility and a thickness of one or more edges of the 2D object to be generated. The thickness is based at least in part on a viewing vector and a normal vector for the 2D object. A rendered 2D object with the determined thickness is generated, including rendering the one or more edges with one or more colors to emulate a lighting condition. The rendered 2D object is presented in a mixed reality space that allows the more efficient viewing of an augmented reality environment with a user device.

20 Claims, 7 Drawing Sheets

(51) Int. Cl.
  *G06T 1/20* (2006.01)
  *G06T 15/00* (2011.01)
  *G06T 15/50* (2011.01)
(58) Field of Classification Search
  CPC .............. G06T 2210/62; G06F 3/0484; G06F 17/5009; H04N 13/279; Y10S 345/952
  See application file for complete search history.

(56) References Cited

U.S. PATENT DOCUMENTS

| | | | |
|---|---|---|---|
| 9,538,164 | B2 | 1/2017 | Bi et al. |
| 9,778,815 | B2* | 10/2017 | Motta .................... G06F 3/012 |
| 9,830,741 | B2 | 11/2017 | Kilgariff et al. |
| 2013/0322665 | A1 | 12/2013 | Bennett et al. |
| 2013/0328925 | A1* | 12/2013 | Latta ..................... G09G 3/003 345/633 |
| 2015/0049201 | A1* | 2/2015 | Liu ....................... H04N 17/00 348/189 |
| 2016/0078649 | A1 | 3/2016 | Bonacina et al. |
| 2018/0276882 | A1* | 9/2018 | Harviainen ........... G06T 19/006 |
| 2019/0108578 | A1* | 4/2019 | Spivack ................ G06T 11/60 |

OTHER PUBLICATIONS

"Autodesk Autocad 2018", Retrieved from: http://help.autodesk.com/view/ACD/2018/ENU/?guid=GUID-65C72A8C-2B2E-4CCD-B596-5D14B3742035, Retrieved on Jul. 7, 2018, 2 Pages.

Apodaca, Tony, "Using RenderMan in Animation Production", in Proceedings of ACM Siggraph 1995, Course 4, Aug. 7, 1995, 37 Pages.

Hirche, et al., "Hardware Accelerated Per-Pixel Displacement Mapping", in Proceedings of the Graphics Interface, May 17, 2004, 8 Pages.

Ikedo, Tsuneo, "Creating Realistic Scenes in Future Multimedia Systems", in Proceedings of the IEEE Multi Media, vol. 9 , Issue 4, Dec. 10, 2002, pp. 56-72.

"International Search Report and Written Opinion Issued in PCT Application No. PCT/US2019/029553", dated Oct. 30, 2019, 25 Pages.

Qin, Zheng, "Vector Graphics for Real-time 3DRendering", in Thesis submitted to the University of Waterloo, 2009, 122 Pages.

Wang, et al., "View-Dependent Displacement Mapping", in Journal of ACM Transactions on Graphics, vol. 22, Issue 3, Jul. 27, 2003, 6 Pages.

* cited by examiner

FAKE THICKNESS ON A TWO-DIMENSIONAL OBJECT

CROSS-REFERENCE TO RELATED APPLICATION

This nonprovisional application claims the benefit of and priority to U.S. Provisional Application No. 62/671,332, filed May 14, 2018, which is incorporated by reference herein in its entirety.

BACKGROUND

Augment reality devices allow a user to view a real-world scene through a lens with holograms appearing as part of that real-world scene. Augmented reality and virtual reality systems are increasingly popular, particularly for applications in which a user can immerse him or herself into an alternate reality environment when wearing a head-mounted display that displays virtual and/or augmented reality user experiences.

For example, augmented reality allows a user to see through a head-mounted display, such as glasses or other wearable display devices having near-eye display panels as lenses to view the surrounding environment, while also seeing images of virtual objects. These virtual objects often include holograms that are generated for display and appear as a part of the environment. Thus, augmented reality systems display various types of virtual images or graphics that enhance or augment the environment that a user experiences.

Using three-dimensional (3D) user interface (UI) elements in augmented reality devices can help enhance realism and improve the experience of user interaction. However, augmented reality devices, such as head wearable mixed realty smart glasses, can have aliasing artifacts on 3D geometry that results in bad visual quality. The aliasing artifacts are a result of these devices being unable to perform antialiasing, and post-processing in general because of the limited processing power and thermal requirements of the devices, particularly in untethered devices. Thus, these devices may be unable to satisfactorily display 3D objects, resulting in a less than optimal user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating an object in a mixed reality space comprises obtaining a two-dimensional (2D) object and determining a thickness and a visibility of one or more edges of the 2D object to be generated to emulate a three-dimensional (3D) thickness. The method further comprises generating a view angle dependent rim drawing of the 2D object having the emulated 3D thickness and presenting the view angle dependent rim drawing of the 2D object in a mixed reality space.

Many of the attendant features will be more readily appreciated as the same becomes better understood by reference to the following detailed description considered in connection with the accompanying drawings.

BRIEF DESCRIPTION OF THE DRAWINGS

Corresponding reference characters indicate corresponding parts throughout the drawings.

DETAILED DESCRIPTION

Referring to the figures, examples of the disclosure enable generation of an illusion of 3D thickness of a flat 2D object, such as a 2D card, without using 3D geometry. Coupled with view angle dependent rim (also referred to as edge) drawing, and the usage of transparency on the edges of the 2D card, anti-aliased render of the object is created with the feeling, or representation, of the presence of thickness. The methods described herein in some examples use a special shader, that works on quads, which are commonly used by user interface (UI) elements, as depicted herein. In some examples, the special shader is a combined vertex shader and fragment shader.

In one example, an augmented reality (AR) system configured to perform virtual reality (VR) or mixed reality (MR) processing creates the illusion of 3D thickness of a flat 2D element (e.g., a flat 2D card) without using 3D geometry, including using the view angle and the transparency on the edges of the 2D card with a special shader to generate a feeling of thickness in 2D objects. Aspects of the disclosure further provide increased user interaction performance by enabling realism and improving user experience within a mixed reality space or representation of space. By providing a 3D feel or representation using 2D geometry, aspects of the disclosure further improve processing speed and resource usage of the corresponding computer systems as well. In this manner, when a processor is programmed to perform the operations described herein, the processor is used in an unconventional way, and allows the more efficient viewing of an augmented reality environment with a user device, such as a VR or MR environment.

As described herein, by generating perceived thickness on a UI quad, transforming a camera's world position into the quad's local position, and using logic operations to determine which side the camera is located on relative to the quad, the shader tool determines which edge (or edges) on the quad to render. The shader tool uses a dot product to calculate the cosine of horizontal and vertical angles between the viewing vector and the quad's normal vector in some examples to determine the thickness of the edges to be rendered. This result is further filtered by the value received from the logical operation determination to only draw, or render, viewable edges. The filtered results are modified to compensate for a scaling factor so that the thickness of edges is independent of the quad scale. The shade tool uses the values from the modified result to render horizontal edge colors and vertical edge colors separately, to emulate lighting conditions. A smoothstep function is utilized to produce smoothing result. As a result, anti-aliased edges of the quad are added, and the visibility, thickness, and color of the edges all follow the same rule of 3D geometry, while being rendered on a 2D object.

In some examples, a person can wear a head-mounted display unit to immerse him or herself in a VR and/or AR environment. Generally, the term "alternate reality" is used herein to refer to devices and systems that are implemented for VR and/or AR. A head-mounted display unit is an AR device that can be worn by a user and implemented with various systems and sensors to generate a hologram (e.g., a generated image or graphic) that appears in an environment with real objects (e.g., a HoloLens® device). Various examples can be implemented in connection with any type of device capable of operating in a virtual and/or augment reality environment.

In various examples, the AR device is any type of display system providing a view through optics so that the generated image that is displayed to the user is overlaid onto a real-world view. This AR or equivalently MR is provided in some examples by the HoloLens® device. Thus, as a wearable display system, an AR device can incorporate components, such as processing unit(s), computer interface(s) that provide network connectivity, and camera(s) etc. These components can be housed in the headpiece, as in the HoloLens®, or in a separate housing connected to the headpiece by wireless or wired means.

The AR device also includes an imaging application that is implemented to generate holograms for display in various examples. The imaging application can be implemented as a software application or modules, such as computer-executable software instructions that are executable with the processing system. The imaging application can be stored on computer-readable storage memory (e.g., the memory), such as any suitable memory device or electronic data storage implemented in the AR device.

Figure 1:
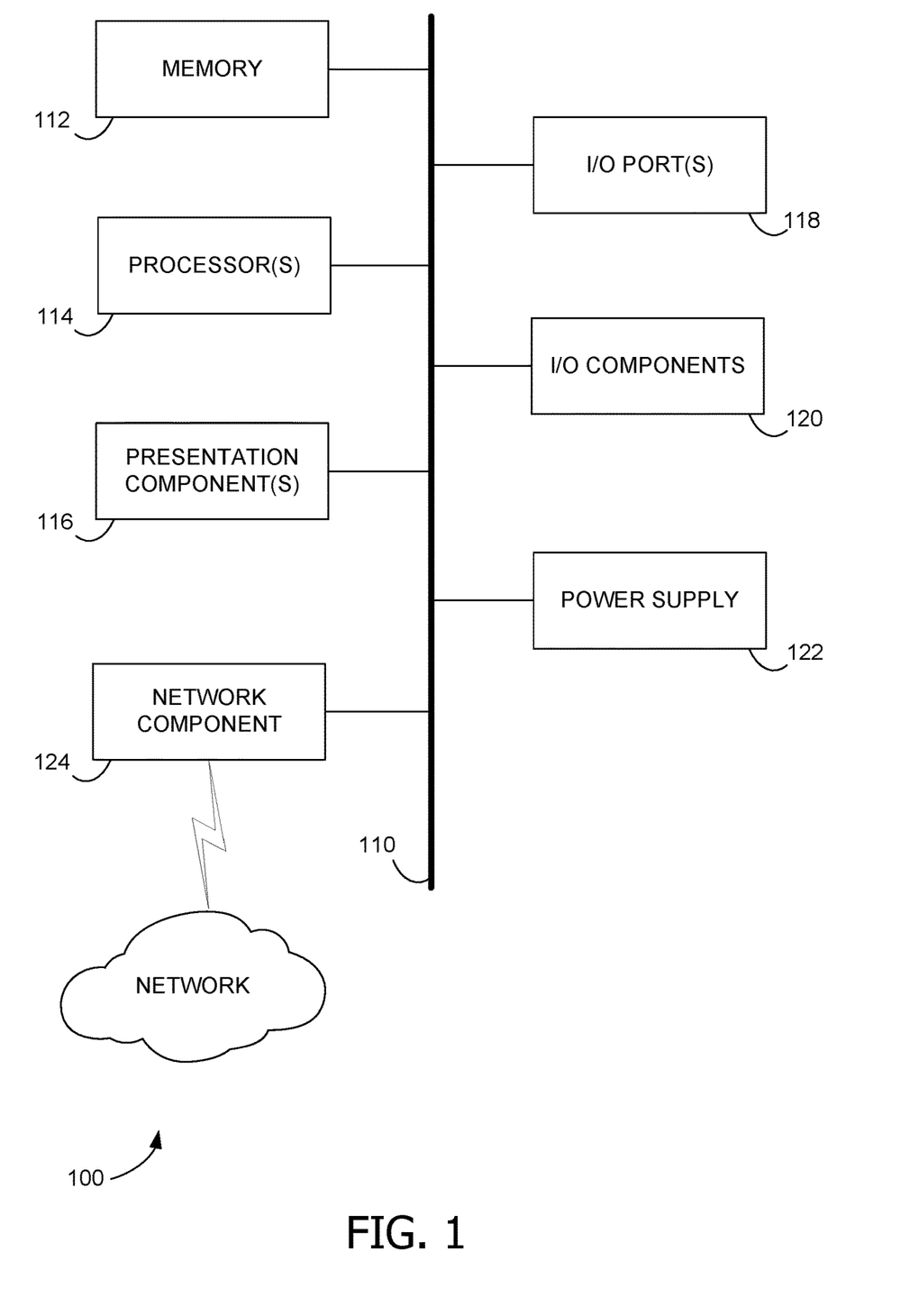
FIG. 1 is a block diagram of an example computing environment suitable for implementing some of the various examples disclosed herein.

FIG. 1 is a block diagram of an example computing device 100 for implementing aspects disclosed herein and is designated generally as the computing device 100. The computing device 100 is but one example of a suitable computing environment and is not intended to suggest any limitation as to the scope of use or functionality of various embodiments of the invention. Neither should the computing device 100 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples can be practiced in a variety of system configurations, including personal computers, laptops, smart phones, mobile tablets, hand-held devices, consumer electronics, specialty computing devices, etc. The disclosed examples can also be practiced in distributed computing environments, such as those disclosed in FIG. 2 described in more detail below, where tasks are performed by remote-processing devices that are linked through a communications network.

The computing device 100 includes a bus 110 that directly or indirectly couples the following devices: memory 112, one or more processors 114, one or more presentation components 116, input/output (I/O) ports 118, I/O components 120, a power supply 122, and a network component 124. The computing device 100 should not be interpreted as having any dependency or requirement related to any single component or combination of components illustrated therein. While the computing device 100 is depicted as a single device, multiple computing devices 100 can work together and share the depicted device resources. For instance, the memory 112 can be distributed across multiple devices, the processor(s) 114 can be housed on different devices, and so on.

The bus 110 represents a system bus that can be any of several types of bus structures, including a memory bus or memory controller, a peripheral bus, and a local bus using any of a variety of bus architectures.

Although the various blocks of FIG. 1 are shown with lines for the sake of clarity, delineating various components is more accurately grey and fuzzy. For example, one can consider a presentation component such as a display device to be an I/O component. Also, processors have memory. Such is the nature of the art, and the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and the references herein to a "computing device."

The memory 112 can be used to store and access instructions configured to carry out the various operations disclosed herein. In some examples, the memory 112 includes computer-readable media in the form of volatile and/or nonvolatile memory, removable or non-removable memory, data disks in virtual environments, or a combination thereof.

The memory area stores, among other data, one or more applications. The applications, when executed by the processor, operate to perform functionality on the computing device. The memory area further stores one or more computer-executable components. Exemplary components can include a user interface component.

By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Computer storage media does not, however, include propagated signals. Rather, computer storage media excludes propagated signals. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory includes computer storage media in the form of volatile and/or nonvolatile memory such as read only memory (ROM) and random-access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by a processing unit or processor.

The computer can also include other removable/non-removable, volatile/nonvolatile computer storage media, such as, for example only, a hard disk drive that reads from or writes to non-removable, nonvolatile magnetic media, a universal serial bus (USB) port that provides for reads from or writes to a removable, nonvolatile memory, and an optical disk drive that reads from or writes to a removable, nonvolatile optical disk such as a CD ROM or other optical media. Other removable/non-removable, volatile/nonvolatile computer storage media that can be used in an exemplary operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface, and a USB port and optical disk drive are typically connected to the system bus by a removable memory interface.

The processor(s) 114 can include any quantity of processing units that read data from various entities, such as the memory 112 or the I/O components 120. Specifically, the processor(s) 114 are programmed to execute computer-executable instructions for implementing aspects of the disclosure. The instructions can be performed by the processor, by multiple processors within the computing device 100, or by a processor external to the computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations can be performed by an analog client computing device and/or a digital client computing device.

The presentation component(s) 116 present data indications to a user or other device. Exemplary presentation components include a display device, speaker, printing component, vibrating component, etc. One skilled in the art will understand and appreciate that computer data can be presented in a number of ways, such as visually in a graphical user interface (GUI), audibly through speakers, wirelessly between computing devices 100, across a wired connection, or in other ways.

The ports 118 allow the computing device 100 to be logically coupled to other devices including the I/O components 120, some of which can be built in. Examples of the I/O components 120 include, for example but without limitation, a microphone, keyboard, mouse, joystick, game pad, satellite dish, scanner, printer, wireless device, etc.

In some examples, the network component 124 includes a network interface card and/or computer-executable instructions (e.g., a driver) for operating the network interface card. Communication between the computing device 100 and other devices can occur using any protocol or mechanism over any wired or wireless connection. In some examples, the network component 124 is operable to communicate data over public, private, or hybrid (public and private) networks using a transfer protocol, between devices wirelessly using short range communication technologies (e.g., near-field communication (NFC), BLUETOOTH® branded communications, or the like), or a combination thereof.

A computer, or computing device, as used herein, represents any device executing instructions (e.g., as application programs, operating system functionality, or both) to implement the operations and functionality as described herein. The computing device can include a mobile computing device or any other portable device. In some examples, the mobile computing device includes a mobile telephone, laptop, tablet, computing pad, netbook, gaming device, wearable device and/or portable media player. The computing device can also include less portable devices such as desktop personal computers, kiosks, tabletop devices, industrial control devices, wireless charging stations, and electric automobile charging stations. Additionally, the computing device can represent a group of processing units or other computing devices.

Figure 2:
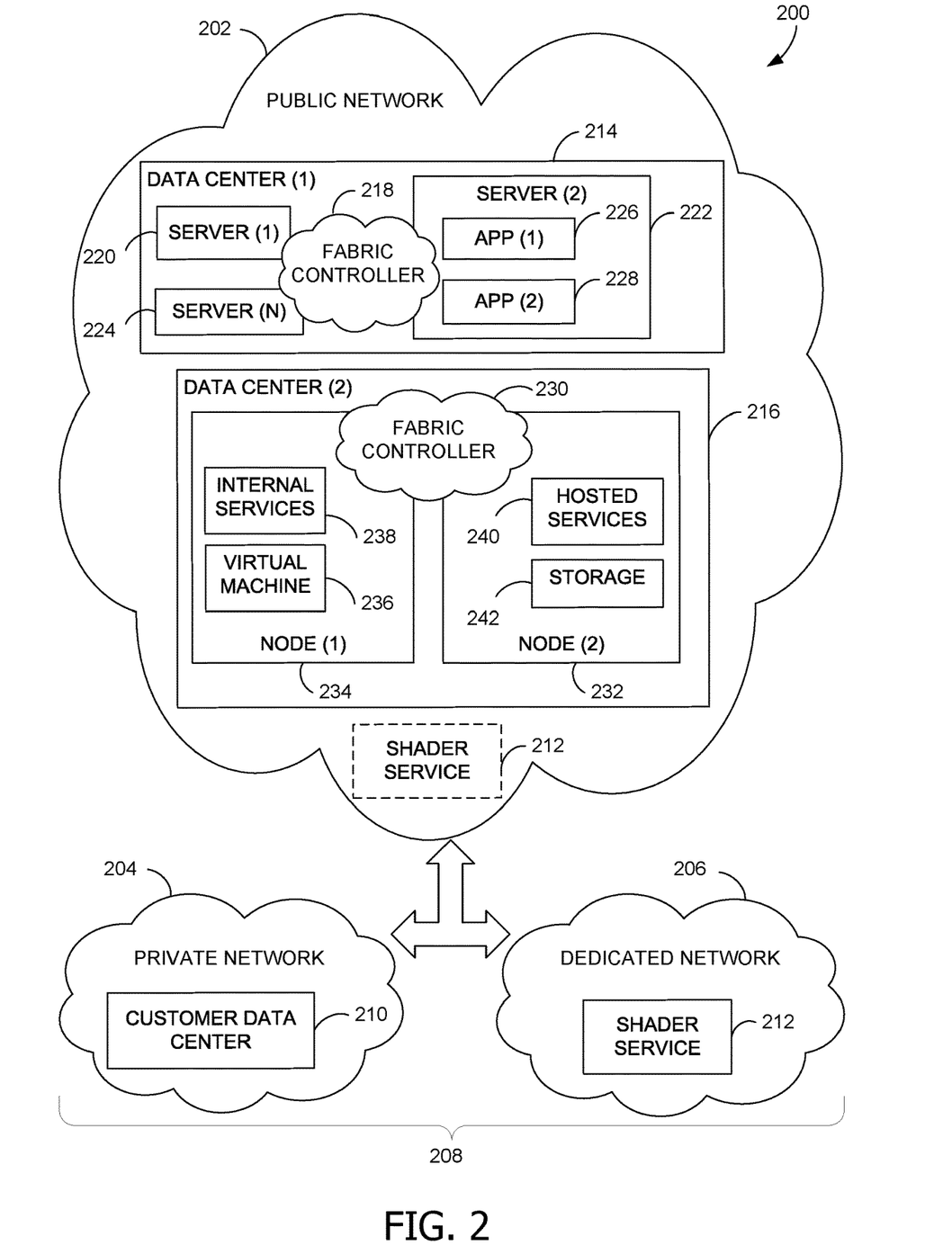
FIG. 2 is a block diagram of an example cloud-computing infrastructure suitable for a shader service implementing some of the various examples disclosed herein.

Turning now to FIG. 2, an exemplary block diagram illustrates a cloud-computing environment for rendering a 3D representation using a 2D object. The architecture 200 illustrates an exemplary cloud-computing infrastructure, suitable for use in implementing aspects of this disclosure. The architecture 200 should not be interpreted as having any dependency or requirement related to any single component or combination of components illustrated therein. In addition, any number of nodes, virtual machines, data centers, role instances, or combinations thereof can be employed to achieve the desired functionality within the scope of embodiments of the present disclosure.

The distributed computing environment of FIG. 2 includes a public network 202, a private network 204, and a dedicated network 206. The public network 202 can be a public cloud-based network of computing resources, for example. The private network 204 can be a private enterprise network or private cloud-based network of computing resources. And the dedicated network 206 can be a third-party network or dedicated cloud-based network of computing resources. In some examples, the private network 204 can host a customer data center 210, and the dedicated network 206 can host cloud shader services 212, which are discussed in more detail below relative to FIG. 4.

The hybrid cloud 208 can include any combination of the public network 202, the private network 204, and the dedicated network 206. For example, the dedicated network 206 can be optional, with the hybrid cloud 208 comprised of the public network 202 and the private network 204. Along these lines, some customers can opt to only host a portion of the customer data center 210 in the public network 202 and/or the dedicated network 206, retaining some of the customers' data or hosting of customer services in the private network 204. For example, a customer that manages healthcare data or stock brokerage accounts can elect or be required to maintain various controls over the dissemination of healthcare or account data stored in its data center or the applications processing such data (e.g., software for reading radiology scans, trading stocks, etc.). Myriad other scenarios exist whereby customers desire or need to keep certain portions of data centers under the customers' own management. Thus, in some examples, customer data centers can use the hybrid cloud 208 in which some data storage and processing is performed in the public network 202 while other data storage and processing is performed in the dedicated network 206.

The public network 202 can include data centers configured to host and support operations, including tasks of a distributed application, according to a fabric controller 218. It will be understood and appreciated that the data center 214 and the data center 216 shown in FIG. 2 are merely examples of suitable implementations for accommodating one or more distributed applications and are not intended to suggest any limitation as to the scope of use or functionality of examples disclosed herein. Neither should the data center 214 and the data center 216 be interpreted as having any dependency or requirement related to any single resource, combination of resources, combination of servers (e.g., servers 220 and 224), combination of nodes (e.g., nodes 232 and 234), or a set of application programming interfaces (APIs) to access the resources, servers, and/or nodes.

The data center 214 illustrates a data center comprising a plurality of servers, such as the servers 220 and 224. The fabric controller 218 is responsible for automatically managing the servers 220 and 224 and distributing tasks and other resources within the data center 214. By way of example, the fabric controller 218 relies on a service model (e.g., designed by a customer that owns the distributed application) to provide guidance on how, where, and when to configure the server 222 and how, where, and when to place the application 226 and the application 228 thereon in some examples. One or more role instances of a distributed application can be placed on one or more of the servers 220 and 224 of the data center 214, where the one or more role instances can represent the portions of software, component programs, or instances of roles that participate in the distributed application. In other examples, one or more of the role instances can represent stored data that are accessible to the distributed application.

The data center 216 illustrates a data center comprising a plurality of nodes, such as the node 232 and the node 234. One or more virtual machines can run on nodes of the data center 216, such as a virtual machine 236 of the node 234 for example. Although FIG. 2 depicts a single virtual node on a single node of the data center 216, any number of virtual nodes can be implemented on any number of nodes of the data center 216 in accordance with illustrative embodiments of the disclosure. Generally, the virtual machine 236 is allocated to role instances of a distributed application, or service application, based on demands (e.g., amount of processing load) placed on the distributed application. As used herein, the phrase "virtual machine" is not meant to be limiting, and can refer to any software, application, operating system, or program that is executed by a processing unit to underlie the functionality of the role instances allocated thereto. Further, the virtual machine(s) 236 can include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of the data center 216 and for placing the role instances and other resources (e.g., software components) within the data center 216. By way of example, the fabric controller 230 relies on a service model (e.g., designed by a customer that owns the service application) to provide guidance on how, where, and when to configure the virtual machines, such as the virtual machine 236, and how, where, and when to place the role instances thereon in some examples.

As discussed above, the virtual machines can be dynamically established and configured within one or more nodes of a data center. As illustrated herein, the node 232 and the node 234 can be any form of computing devices, such as, for example, a personal computer, a desktop computer, a laptop computer, a mobile device, a consumer electronic device, a server, the computing device 100 of FIG. 1, and the like. In one instance, the nodes 232 and 234 host and support the operations of the virtual machine(s) 236, while simultaneously hosting other virtual machines carved out for supporting other tenants of the data center 216, such as internal services 238 and hosted services 240. Often, the role instances can include endpoints of distinct service applications owned by different customers.

Typically, each of the nodes 232 and 234 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit can encompass a processor (not shown) coupled to the computer-readable medium (e.g., computer storage media and communication media) accommodated by each of the nodes.

The role of instances that reside on the nodes can be to support operation of service applications, and thus they can be interconnected via APIs. In one instance, one or more of these interconnections can be established via a network cloud, such as the public network 202. The network cloud serves to interconnect resources, such as the role instances, which can be distributed across various physical hosts, such as the nodes 232 and 234. In addition, the network cloud facilitates communication over channels connecting the role instances of the service applications running in the data center 216. By way of example, the network cloud can include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Figure 3:
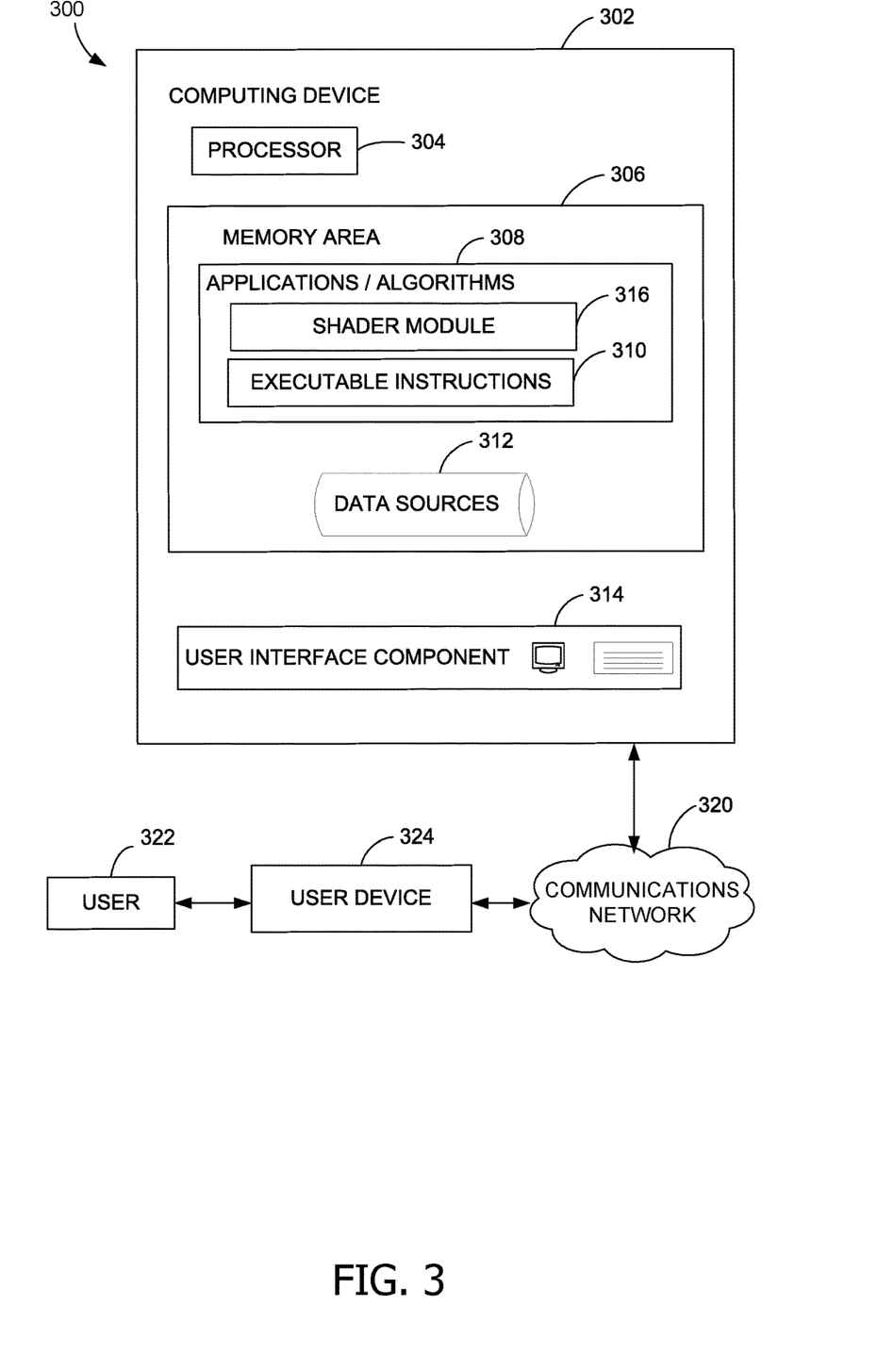
FIG. 3 is a block diagram of an example computing environment that can be implemented as a real-world device or virtual device using some of the various examples disclosed herein.

FIG. 3 is a block diagram of an example computing environment 300 that can be implemented as a real-world device or virtual device using some of the various examples disclosed herein. The computing device 302 represents any device executing instructions (e.g., as application programs, operating system functionality, or both) to implement operations and functionality as described herein. The computing device 302 can include a mobile computing device or any other portable device. In some examples, a mobile computing device includes a mobile telephone, laptop, tablet, computing pad, netbook, gaming device, wearable device, head mounted display (HMD) and/or portable media player. The computing device 302 can also represent less portable devices such as desktop personal computers, kiosks, tabletop devices, industrial control devices, wireless charging stations, electric automobile charging stations, and other physical objects embedded with computing resources and/or network connectivity capabilities. Additionally, the computing device 302 can represent a group of processing units or other computing devices.

In some examples, the computing device 302 has at least one processor 304, a memory area 306, and at least one user interface. These can be the same or similar to the processor(s) 114 and memory 112 of FIG. 1, respectively. The processor 304 includes any quantity of processing units and is programmed to execute computer-executable instructions for implementing aspects of the disclosure. The instructions can be performed by the processor or by multiple processors within the computing device, or performed by a processor external to the computing device. In some examples, the processor 304 is programmed to execute instructions such as those that are illustrated in the other figures.

The computing device 302 further has one or more computer readable media such as the memory area 306. The memory area 306 includes any quantity of media associated with or accessible by the computing device. The memory area 306 can be internal to the computing device 302 (as shown in FIG. 3), external to the computing device (not shown), or both (not shown). In some examples, the memory area 306 includes read-only memory and/or memory wired into an analog computing device.

The memory area 306 stores, among other data, one or more applications or algorithms 308 that include data and executable instructions 310. The applications, when executed by the processor, operate to perform functionality on the computing device. Exemplary applications include shader applications and/or components, such as a shader module 316, for example. The applications can communicate with counterpart applications or services such as web services accessible via a network, including a communications network 320. For example, the applications can represent downloaded client-side applications that correspond to server-side services executing in a cloud. In some examples, applications generated can be configured to communicate with data sources and other computing resources in a cloud during runtime, or can share and/or aggregate data between client-side services and cloud services. The memory area 306 can store data sources 312, which represent data stored locally at the memory area 306, data access points stored locally at the memory area 306 and associated with data stored remote from the computing device 302, or any combination of local and remote data in various examples.

The user interface component 314 can include instructions executed by the processor 304 of the computing device 302, and cause the processor 304 to perform operations, including to receive user input, provide output to a user and/or user device, and interpret user interactions with a computing device. Portions of the user interface component 314 can thus reside within the memory area 306. In some examples, the user interface component 314 includes a graphics card for displaying data to a user 322 and receiving data from the user 322. The user interface component 314 can also include computer-executable instructions (e.g., a driver) for operating the graphics card. Further, the user interface component 314 can include a display (e.g., a touch screen display or natural user interface) and/or computer-executable instructions (e.g., a driver) for operating the display. In some examples, the display can be a 3D display, such as can be found in an HMD. The user interface component 314 can also include one or more of the following to provide data to the user or receive data from the user: a keyboard (physical or touchscreen display), speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the computing device in a particular way. In another example, the user can input commands or manipulate data by providing a gesture detectable by the user interface component, such as a touch or tap of a touch screen display or natural user interface. In still other examples, a user, such as the user 322, can interact with a separate user device 324, which can control or be controlled by the computing device 302 over the communications network 320, a wireless connection, or a wired connection.

Figure 4:
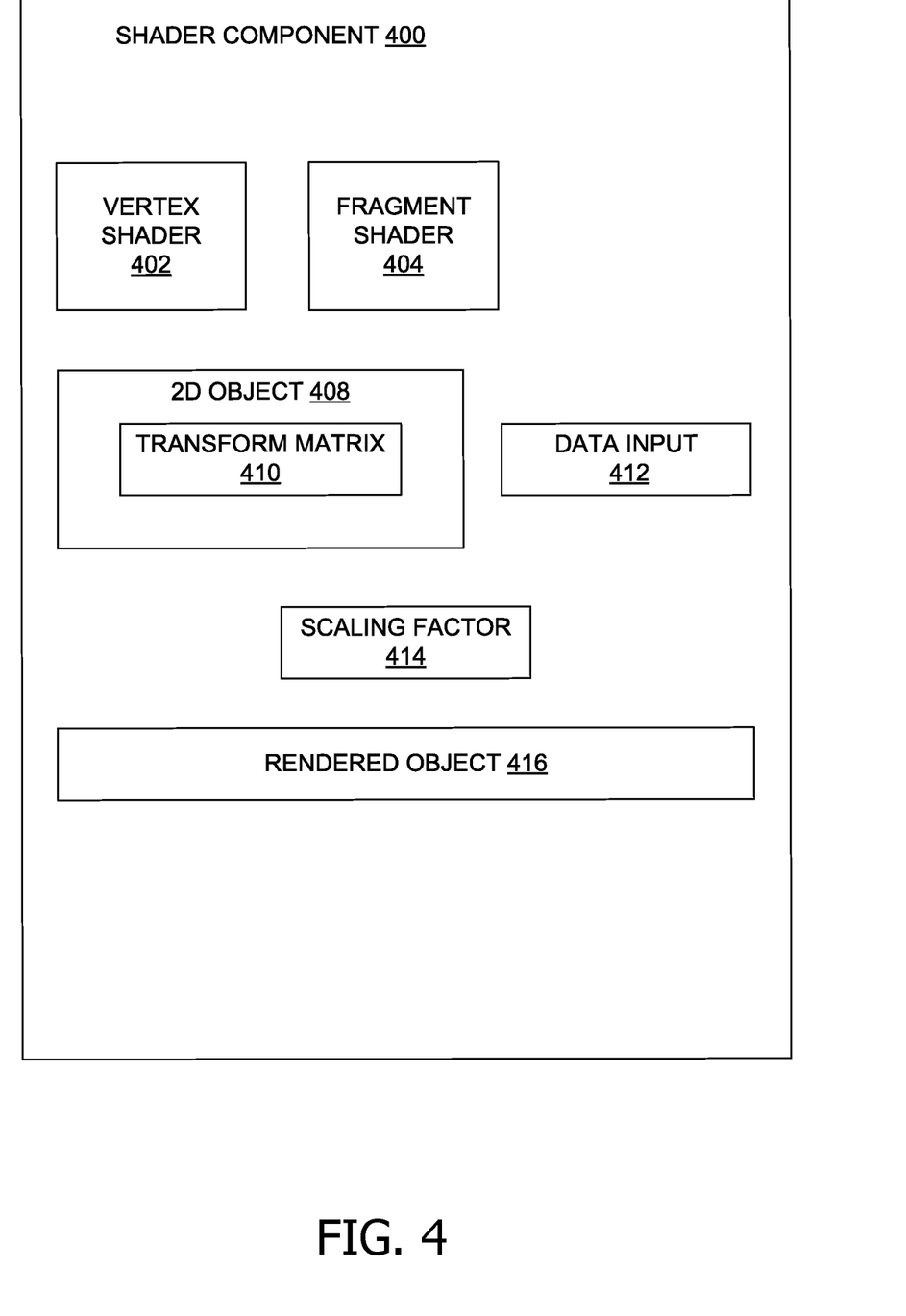
FIG. 4 is a block diagram of a shader component suitable for implementing some of the various examples disclosed herein.

FIG. 4 is a block diagram of a shader component 400 that is suitable for implementing some of the various examples disclosed herein. The shader component 400 can be implemented as a cloud service, in part or in whole, and can further be implemented on one or more computer storage devices having computer-executable instructions stored thereon for rendering "fake" thickness on 2D objects. That is, the shader component 400 can leverage computing environments described in relation to other figures described herein. It should be understood that functionality can be allocated among the different portions in some embodiments differently than is described in this exemplary embodiment.

The shader component 400 includes a vertex shader 402 and a fragment shader 404. The shader component 400 can obtain or receive a 2D object 408. The 2D object 408 can be a 2D geometry, such as a UI element for example, comprising quads, or quad faces. A quad is a component of a mesh used in modeling operations, having four-edge faces with four vertices. Vertex, or vertices, refers to a position in 3D space, along with other data such as color, vector, and texture coordinates, for example. A face, as used herein, is a closed set of edges (such as a triangle face having three edges, or a quad face having four edges). An edge, as used herein, is a connection between two vertices.

The 2D object 408 can include a number of different values and/or parameters identified as properties of the 2D object 408 by the shader component 400. For example, the properties are defined in some examples as follows:

```
{
    Properties
    {
        _MainTex("Diffuse Map", 2D) = "white" { }
        _Color("Color", Color) = (1, 1, 1, 1)
        _Color_frame_H("Frame Color H", Color) = (1, 1, 1, 1)
//Horizontal frame color
        _Color_frame_V("Frame Color V", Color) = (1, 1, 1, 1)
//Vertical frame color
        _Size("Edge width, --, --, Margin", Vector) = (0.02, 0, 0, 0.02)
        _Alpha("Alpha", Range(0, 1)) = 1
    }
```

The 2D object 408 includes a transform matrix 410 in some examples. The transform matrix 410 is passed to the vertex shader 402 automatically when the 2D object 408 is obtained by the shader component 400. The transform matrix 410 is associated with the 2D object 408 and includes elements that are used by the vertex shader 402 to define a scaling factor 414 for the 2D object 408. The scaling factor 414 is used by the vertex shader 402 to adjust the thickness of the edge(s) to render. For example, the scaling factor is calculated in some examples, as follows:

```
v2f vert(appdata v)
{
    v2f o;
    //Calculate scale factor
    float3 scale = float3(length(float3(UNITY_MATRIX_M[0].x,
UNITY_MATRIX_M[1].x, UNITY_MATRIX_M[2].x)),
                    length(float3(UNITY_MATRIX_M[0].y,
UNITY_MATRIX_M[1].y, UNITY_MATRIX_M[2].y)),
                    length(float3(UNITY_MATRIX_M[0].z,
UNITY_MATRIX_M[1].z, UNITY_MATRIX_M[2].z)));
    float4 pos = v.vertex;
    o.position = UnityObjectToClipPos(v.vertex);
    o.uv.xy = TRANSFORM_TEX(v.texcoord, _MainTex);
    o.uv.zw = (v.texcoord.xy - 0.5) * 2;
```

In some examples, a data input 412 is optionally received by the shader component 400 in association with the 2D object 408. In some examples, the data input 412 includes separate elements defined by developers or users, separately defined parameters for the desired 3D output, and the like. For example, the data input 412 can define the color of a background, or a desired size/scale of an element.

The vertex shader 402 uses one or more logic operations to determine the relative location of a camera, which is used to determine which edge(s) to render to generate the perceived thickness on the quad (or other shape element). The vertex shader 402 determines where the camera is relative to the 2D object 408 (e.g., to the left of the object, to the right of the object, upper left quadrant, lower left quadrant, etc.) and which vertices of the quad lie on the same side with the camera, indicating that the corresponding edges should be visible. In other words, the vertex shader 402 transforms the camera's world position into the quad's local position, then uses logic operations to determine which side of the quad the camera is located on to decide which edge on the quad to draw. As an example, assume the "pos.x" value is larger than zero (0), such a 0.50 for example, indicating the vertices lie on the right side of the quad, and the first test function returns "1". In the second test function, if the camera's x position (oCamPos.x) is larger than 0.5 which is the quad's right most border, the function returns "1", indicating the camera lies on the right side of the quad. The product of these two functions returns "1" only when the above two test functions return "1", indicating vertices on the right side of the quad is visible. This value is stored in the "x" part of a vector4 value "o.show".

As another example, assume the "pos.x" value is less than zero (0), such as -0.50 for example, indicating the vertices lie on the left side of the quad and the first test function returns "0". In the second test function, if the camera's x position (oCamPos.x) is larger than 0.5 which is the quad's right most border, the function returns "1", indicating the camera lies on the right side of the quad. The product of these two functions returns "0", indicating vertices on the left side of the quad is invisible. This value is stored in the "z" part of a vector4 value "o.show". The vertex shader 402 returns a visibility value that indicates visibility of each edge of a quad, where a value of 0 is not visible and a value of 1 is visible. The vertex shader 402 uses the visibility value to render only visible edges, for example, as follows:

```
//Calculate which edges to show
    fixed4 oCamPos = mul(unity_WorldToObject,
    fixed4(_WorldSpaceCameraPos.xyz, 1));
    //Determine which edge is visible by testing camera's relative position
    to object and the position of each corner vertex
        o.show = step(0, fixed4(pos.xy, -pos.xy)) * step(0.5,
```

```
    fixed4(oCamPos.xy, -oCamPos.xy));
    fixed4 edge = o.show;
```

In addition to determining which edge(s) to render, the vertex shader 402 determines a thickness of the edge(s) to be drawn. The vertex shader 402 uses a dot product operation to calculate the cosine of horizontal and vertical angles between the viewing vector and the quad's normal vector, to determine the thickness of the edge(s) to be drawn in some examples. This result is further filtered by the visibility value in order to only render viewable edges. In these examples, the dot product operation between vectors is the sum of the product of each corresponding element of the two vectors, where the first vector is the viewing vector of the camera and the second vector is where the object is facing in space. These two vectors are normalized so that the dot product of these vectors is the cosine of the angle that is used to derive how much of the object is facing the camera, and that cosine value is used to determine the width of the edge to render, for example, as follows:

```
fixed2 vecUnit = normalize(mul(unity_ObjectToWorld, fixed2(0, 1)));
fixed3 wViewDir = WorldSpaceViewDir(pos); //Viewing direction in
world space
edge.xz *= 1 - abs(dot(vecUnit, normalize(wViewDir.xz))); //Calculate
vertical frame's thickness adjusted by viewing angle
edge.yw *= 1 - abs(dot(vecUnit, normalize(wViewDir.yz))); //Calculate
horizontal frame's thickness adjusted by viewing angle
```

It should be noted that the //Calculate vertical frame's thickness adjusted by viewing angle and //Calculate horizontal frame's thickness adjusted by viewing angle use the object's facing direction that is transformed from the object space reference system to the world reference system.

As another example, if the object is viewed head on, or straight on, the viewing angle is 0 degree, and the dot product is 1, subtracting 1, gives 0, indicating zero thickness. If the viewing angle is from a sharp angle, or almost the side of the object, the viewing angle is 90 degrees, and the dot product is 0, subtracting 1, gives 1, indicating full thickness. Since the dot product is a continuous function, as the viewing angle changes from 0 to 90 degrees, the result given by one minus the dot product changes from 0 to 1 in a continues manner, indicating the edge changes from 0 thickness, increasing to some thickness, and finally to full thickness.

The determined thickness of the edges, filtered by the determined visibility, is modified by the vertex shader 402 to compensate for the scaling factor so that the thickness of the edge(s) is/are independent of the quad scale, the scaling factor being derived from the transform matrix of the 2D object. The compensation is performed, for example, as follows:

```
//Adjust by scale factor so that edge width remain independent of scaling;
also make sure frames are not reduced by transparent margin
                    o.solid.zw = 1 - saturate((_Size.x *
(edge.xy + edge.zw) + _Size.w) / scale.xy);
                    return o;
            }
```

The fragment shader 404 uses the scaled result values to render colors for parts of the quad that are visible based on the viewing angle determined by vertex shader 402. The fragment shader 404 renders horizontal edge colors and vertical edge colors separately, to emulate lighting conditions. A smoothstep function is utilized to produce a smoothing result in some examples. As a result, anti-aliased edges of the quad are added, and the visibility, thickness, and color all follow the same rule of 3D geometry, while being rendered on a 2D card.

For example, the quad is rendered with a solid color, using values output from the vertex shader 402 (i.e., solid.zw) to determine whether and at which place to draw the edges, or frame, and this information is used to interpolate the edge color and background color. The edge colors are separately determined for vertical and horizontal edges. The fragment shader 404 determines whether a pixel's position is above or below a threshold. If the pixel's position is determined to be above the threshold, the fragment shader 404 renders the pixel with the frame color; if the pixel's position is determined to be below the threshold, the pixel is rendered with the background color.

Following is another illustrative example:

```
min16float4 frag(v2f i) : COLOR
{
    min16float4 size = __Size;
    min16float4 solid = i.solid;
    min16float alpha = __Alpha;
///////////////////////////////////////
//Use texture or color
    #ifdef TEXTURE
    min16float4 texcol = tex2D(__MainTex, i.uv.xy) *
    (min16float4)__Color;
    #else
    min16float4 texcol = (min16float4)__Color;
    #endif
    texcol.a *= alpha;
///////////////////////////////////////
    //Anti-aliased Quad
    min16float2 disAxis = abs(i.uv.zw);
    min16float2 delta = fwidth(disAxis); //Use this for anti-aliasing
    min16float2 alpha_edge;
    min16float4 show = i.show;
    alpha_edge = (min16float)1 - smoothstep(solid.xy - delta, solid.xy +
    delta, disAxis);
    texcol.a *= alpha_edge.x * alpha_edge.y;
///////////////////////////////////////
    //draw frames; mask out hidden sides
    min16float2 frame = smoothstep(solid.zw - delta, solid.zw +
    delta, disAxis.xy);
    texcol.rgb = lerp(texcol.rgb, (min16float3)__Color_frame_V.rgb,
    frame.x * (show.x + show.z));
    texcol.rgb = lerp(texcol.rgb, (min16float3)__Color_frame_H.rgb,
    frame.y * (show.y + show.w));
///////////////////////////////////////
    return texcol;
};
```

The fragment shader 404 uses a one-pass anti-aliasing method to perform anti-aliasing in the current render pass for rendered object 416, for example, as follows:

```
    //Anti-aliased Quad
        min16float2 disAxis = abs(i.uv.zw);
        min16float2 delta = fwidth(disAxis);
        //Use this for anti-aliasing
            min16float2 alpha_edge;
            min16float4 show = i.show;
        alpha_edge = (min16float)1 - smoothstep(solid.xy - delta,
        solid.xy + delta, disAxis);
        texcol.a *= alpha_edge.x * alpha_edge.y;
```

The rendered object 416 can be output to MR devices or to another computing device, can be used for UI elements (e.g., a background of a button) or objects rendered in a VR or MR environment (e.g., a virtual painting displayed on a wall in MR). The rendered object 416 can be packaged into an application file that is loaded into a MR device, in some examples. In other examples, the shader component 400 can be launched from a VR/MR device and run in real-time to display objects in the VR/MR world as the viewing angles and object angles dynamically change.

Figure 5:
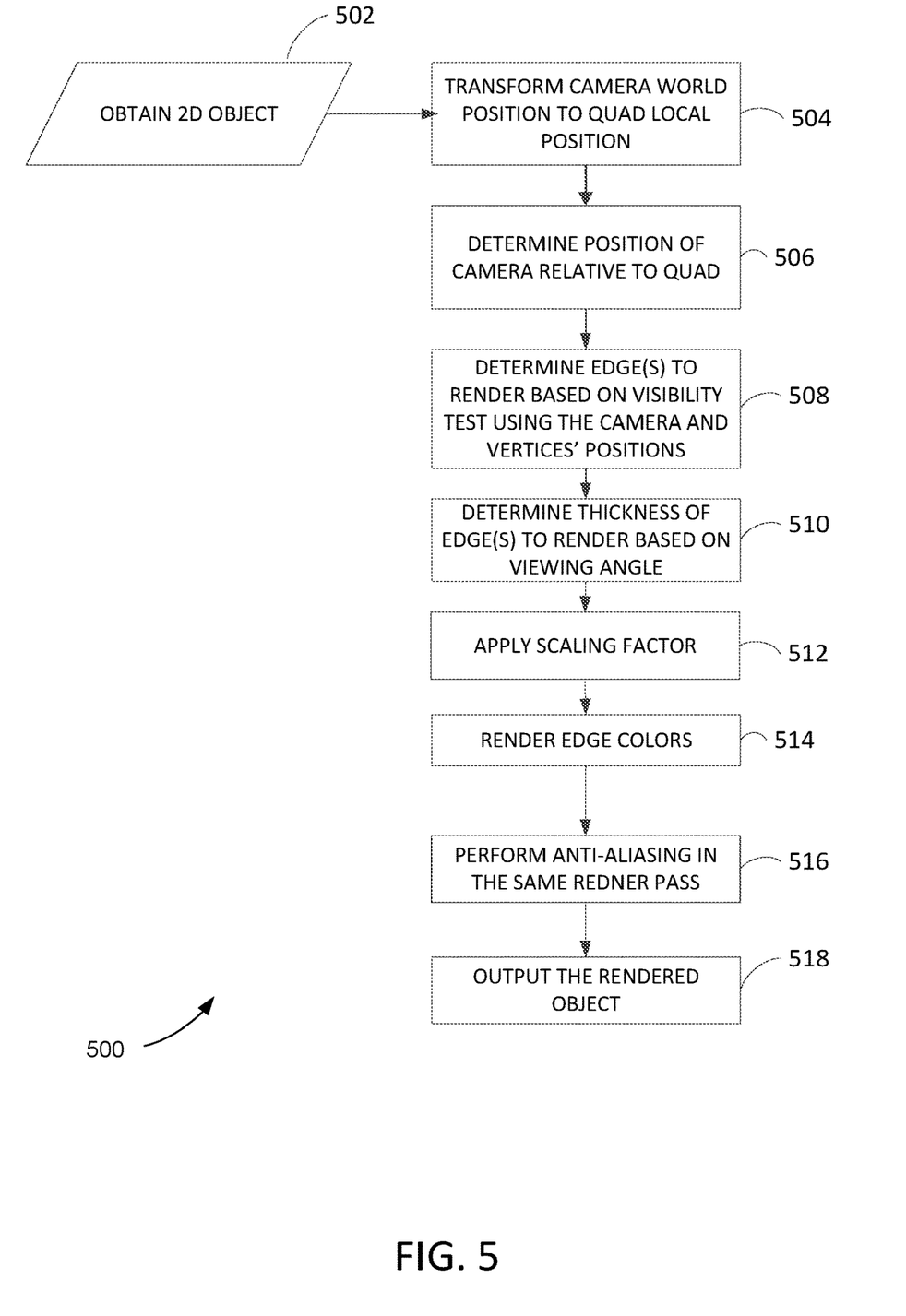
FIG. 5 is a flowchart of a shader process for implementing some of the various examples disclosed herein.

FIG. 5 is a flowchart of a shader process 500 for implementing some of the various examples disclosed herein. The process beings at operation 502 where a 2D object, or 2D geometry, is obtained or received by a shader component, such as the shader component 400 in FIG. 4 for example. The 2D object in various examples is a quad UI element (e.g., a 2D card element).

The process transforms the camera world position to the quad local position at operation 504 to determine the position of a camera relative to the quad at operation 506. By determining the position, the shader component is able to determine which edge(s) to render to generate the perceived thickness, or "fake" thickness" on the quad.

The process determines the edge(s) to render based on a visibility test using the camera and vertices' positions at operation 508. The process determines a thickness of the edge(s) to render at operation 510 based on the viewing angle. A math or logic operation, such as a dot product operation, can be used to calculate the cosine of horizontal and vertical angles between the viewing vector and the quad's normal vector, to determine the thickness of the edge(s) to be drawn as described herein. This result is further filtered by the visibility test value in order to only render viewable edges.

In various examples, the dot product is an operation between vectors, which is the sum of product of each corresponding element of two vectors. Because the two vectors (viewing angle of camera is the first vector, and the direction the object is facing is the second vector) are normalized, the dot product, which is the cosine of the angle, is used to derive how much of the 2D object is facing the camera, and that value (cosine value) is used to determine the width of edge. For example, if the object is thirty degrees facing north, and the viewing angle is fifty degrees facing north, both are in the same world space (or object space). In various examples, the vectors are calculated in xyz position values.

The process applies a scaling factor at operation 512. The determined thickness of the edges, filtered by the determined visibility, is modified to compensate for the scaling factor so that the thickness of the edge(s) is/are independent of the quad scale, the scaling factor being derived from a transform matrix of the 2D object. In some examples, the scaling factor is determined by the transform matrix, which is passed to the shader code automatically (e.g., the shader retrieves the transform matrix, which has the elements that define the scaling factor). The transform matrix is associated with the object in various examples.

The process then renders edge colors at operation 514, rendering horizontal edge colors and vertical edge colors separately, to emulate lighting conditions, such as to emulate 3D type shadows or other effects. In some examples, there is a margin or portion of the edge (e.g., a few pixels) that are transparent (wherein a partial derivative is used to interpolate between adjacent pixels). It should be noted that horizontal and vertical are used merely to describe relative positions of the edges.

The process performs anti-aliasing in the same render pass at operation 516, and outputs the rendered object at operation 518. As a result, anti-aliased edges of the quad are added, and the visibility, thickness, and color of the edges all follow the same rule of 3D geometry, but these elements are only rendered on the 2D object. The rendered object can be output to different devices, such as different types of AR devices (e.g., HoloLens®) or on a personal computer screen, and can be used for UI elements (like a background of a button (UI element)) or a drawing displayed on a wall in MR (any quad element that is viewing angle dependent and has thickness), etc.

A smoothing operation is performed in some examples to smooth the 2D object. Any smoothing technique in the rendering technology can be used.

Figure 6:
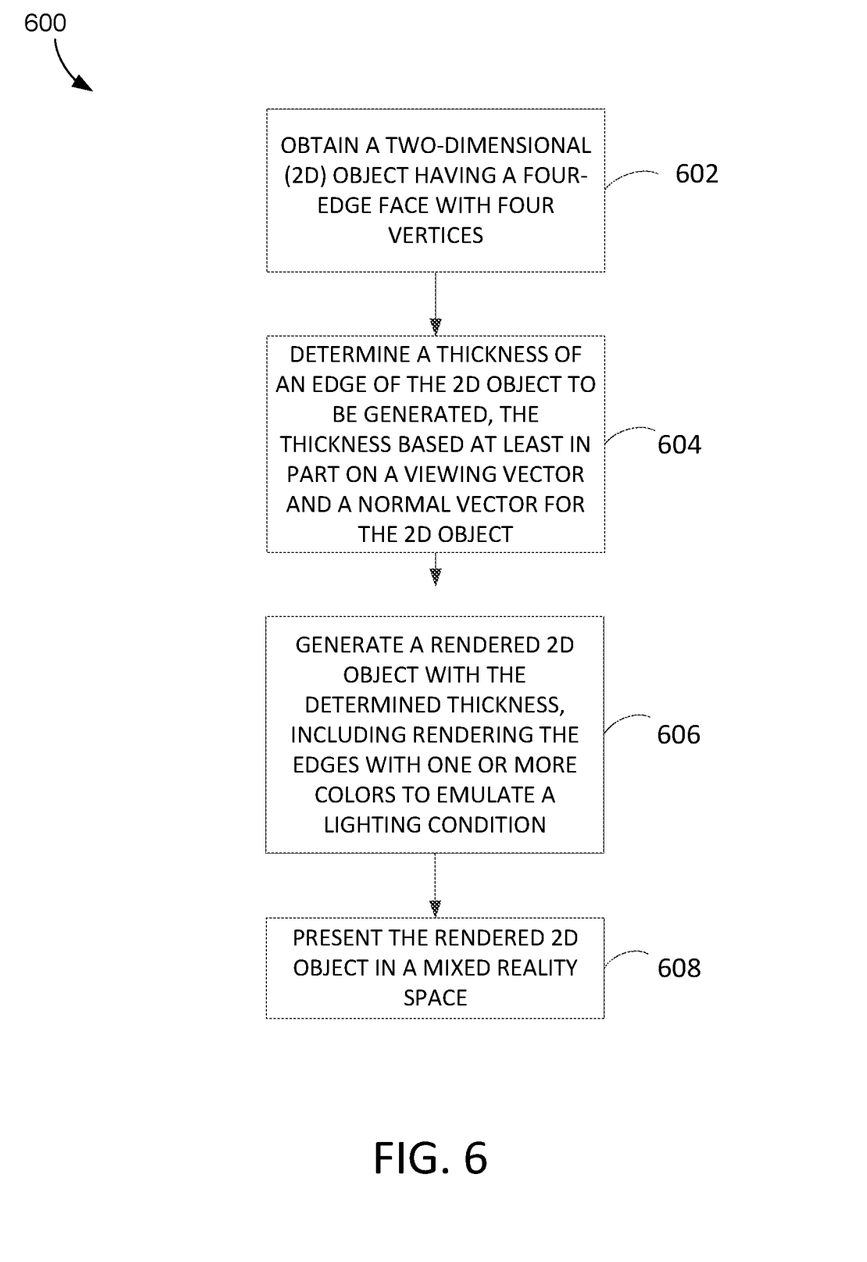
FIG. 6 is a flowchart of process for generating an object in a mixed reality space in accordance with various examples disclosed herein.

FIG. 6 is a flowchart of a process 600 for generating an object in a mixed reality space in accordance with various examples disclosed herein. The process beings at operation 602 where a 2D object having a four-edge face with four vertices is obtained. In various examples, the 2D object is a quad UI element, which can be a component of a mesh. It should be noted that the 2D objects having quad shapes formed from different elements can be used, such as two triangles.

A thickness of an edge of the 2D object to be generated is determined at operation 604. The thickness is based at least in part on a viewing vector and a normal vector for the 2D object. In some examples, logic operations determine which side the camera locates relative to the 2D object to decide which edge on the 2D object to draw the edges as described herein.

A rendered 2D object with the determined thickness is generated at operation 606, including rendering the edges with one or more colors to emulate a lighting condition. In some examples, the appearance of a 3D object is thereby emulated as described herein. This can be referred to as the "fake" 3D thickness on a 2D object (e.g., a 2D card).

The rendered 2D object is presented in a mixed reality space at operation 608. For example, a 2D object is displayed with the "fake" 3D thickness in a smart glass mixed reality device.

The steps or operations depicted in FIGS. 5 and 6 are for illustrative purposes and do not limit the operations to any particular order. In some examples, one or more of the operations described herein can occur simultaneously, concurrently or sequentially. In some examples the process described in FIG. 5 or FIG. 6 is a continuous process executing in real-time. For example, the operations can be performed by an application file that is loaded to a MR device, wherein the user launches the application from the device and application runs shader code in real-time to display objects in the MR world. The operations run in real-time to provide real-time rendering in various examples because the viewing angle and object angle are constantly changing. In one example, a single component, executing in real-time, responds to user input (can be viewing angle change, object position change, or any input change)

Figure 7:
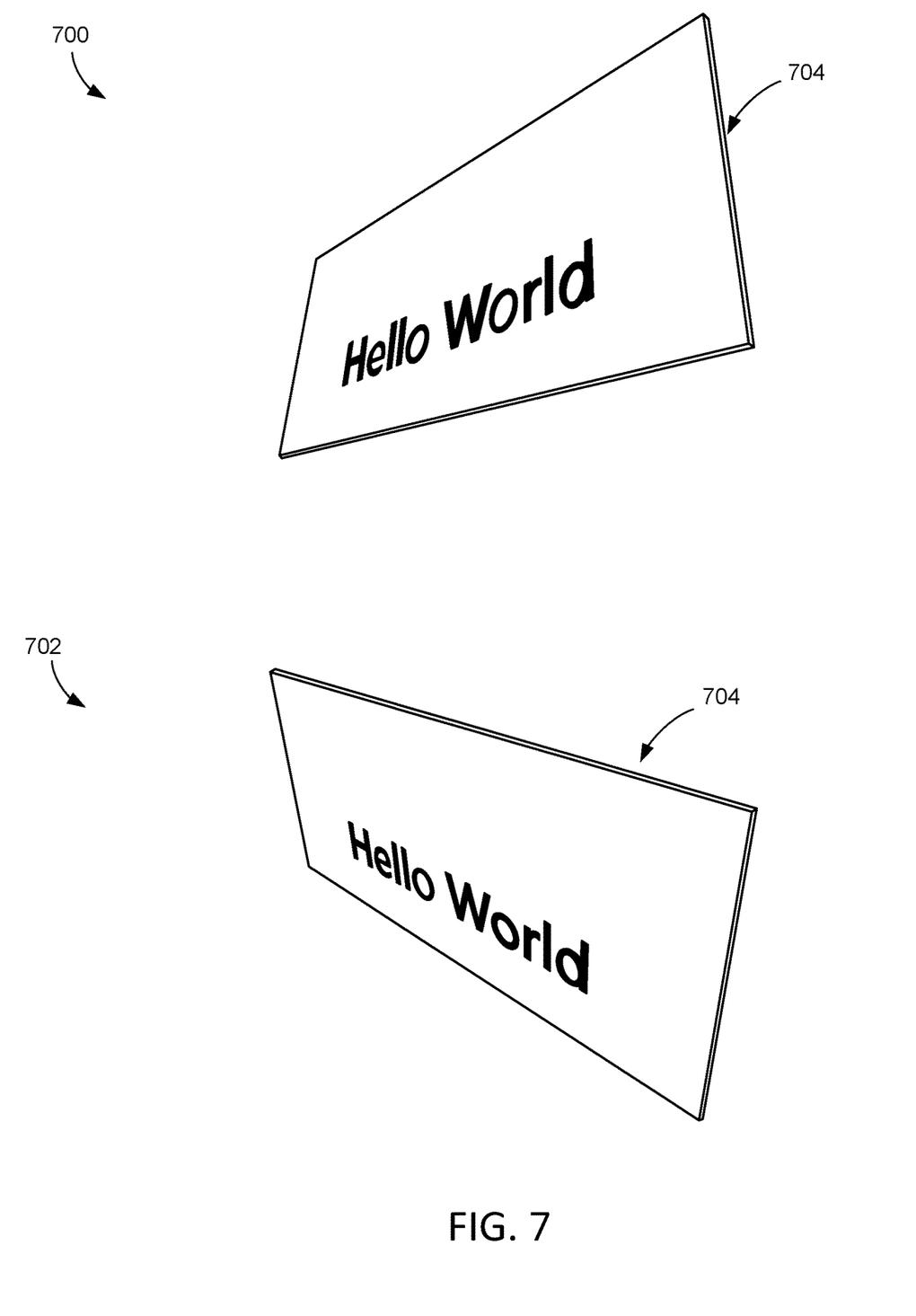
FIG. 7 is an illustrative diagram of "fake" 3D thickness on 2D objects processed by the various examples disclosed herein.

Additionally, in some examples, separate elements defined by developers are passed into the shader code, wherein parameters can be separately defined (width of edge) as a developer defined input. For example, change color of a background (input), change size/scale of an element, etc. can be separately defined. In various examples, the geometry can be a standard quad with a pivot at the center FIG. 7 is an illustrated diagram of fake 3D thickness on 2D objects 700 and 702, illustrated as a 2D cards, which can be output by the various examples disclosed herein. As depicted in this exemplary diagram, the different viewing angles of the object, here a 2D card, impact how the edges 704 are rendered to provide the fake thickness, emulating 3D geometry with a 2D object.

ADDITIONAL EXAMPLES

In some examples, the shader component can be used to render 3D UI elements. In other examples, the shader component can be used in real-time to efficiently render 2D geometry with "fake" thickness, for 3D representation. Some example applications can be architectural MR applications, design MR applications, or any other suitable application using geometries where thickness is desired.

While the aspects of the disclosure have been described in terms of various examples with their associated operations, a person skilled in the art would appreciate that a combination of operations from any number of different examples is also within scope of the aspects of the disclosure.

In examples involving a general-purpose computer, aspects of the disclosure transform the general-purpose computer into a special-purpose computing device when configured to execute the instructions described herein.

Other examples include:

A system for generating an object in a mixed reality space, the system comprising:
  a memory area associated with a computing device, the memory area including a shader component; and
  a processor that executes the shader component to:
    obtain a two-dimensional (2D) object having a face with four vertices;
    determine a thickness of one or more edges of the 2D object to be generated, the thickness based at least in part on a viewing vector and a normal vector for the 2D object;
    generate a rendered 2D object with the determined thickness, including rendering the one or more edges with one or more colors to emulate a lighting condition; and
    present the rendered 2D object in a mixed reality space.

Other examples include:

A computerized method for generating an object in a mixed reality space, the computerized method comprising:
  obtaining a two-dimensional (2D) object;
  determining a thickness and a visibility of one or more edges of the 2D object to be generated to emulate a three-dimensional (3D) thickness;
  generating a view angle dependent rim drawing of the 2D object having the emulated 3D thickness; and
  presenting the view angle dependent rim drawing of the 2D object in a mixed reality space.

Other examples include:

One or more computer storage media having computer-executable instructions for generating an object in a mixed reality space that, upon execution by a processor, cause the processor to at least:
  obtain a two-dimensional (2D) object with four vertices;
  determine a thickness of one or more edges of the 2D object to be generated, the thickness based at least in part on a viewing vector and a normal vector for the 2D object;
  generate a rendered 2D object with the determined thickness, including rendering the one or more edges with one or more colors to emulate a lighting condition; and
  present the rendered 2D object in a mixed reality space.

Alternatively, or in addition to the other examples described herein, examples include any combination of the following:

separately render a horizontal edge color and a vertical edge color of a horizontal edge and a vertical edge of the rendered 2D object, respectively.

transform a camera world position to a local position of the 2D object in the mixed reality space.

determine the one or more edges to render based at least in part on the transformed position.

use a dot product to calculate a cosine of horizontal and vertical angles between the viewing vector and the normal vector to determine the thickness of the one or more edges.

modify a result of the dot product based at least in part on a scaling factor such that the thickness of the one or more edges is independent of the scale of the 2D object.

perform anti-aliasing in a single pass operation with the rendering of the one or more edges.

rendering the one or more edges with a transparency and color to emulate a lighting condition.

wherein the 2D object comprises a quad user interface (UI) element and further comprising performing an anti-aliasing render of the view angle dependent rim drawing in a same rendering operation as rendering one or more colors for one or more edges of the 2D object defined by the thickness.

The examples illustrated and described herein as well as examples not specifically described herein but within the scope of aspects of the disclosure constitute exemplary means for providing "fake" thickness on a 2D object.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for generating an object in a mixed reality space, the system comprising:
    a memory area associated with a computing device, the memory area including a shader component; and
    a processor that executes the shader component to:
        obtain a two-dimensional (2D) object having a face with four vertices;
        determine a thickness of one or more edges of the 2D object to be generated, the thickness based at least in part on a viewing vector and a normal vector for the 2D object;
        generate a rendered 2D object with the determined thickness, including rendering the one or more edges with one or more colors to emulate a lighting condition; and
        present the rendered 2D object in a mixed reality space.

2. The system of claim 1, wherein the processor further executes the shader component to separately render a horizontal edge color and a vertical edge color of a horizontal edge and a vertical edge of the rendered 2D object, respectively.

3. The system of claim 1, wherein the processor further executes the shader component to transform a camera world position to a local position of the 2D object in the mixed reality space.

4. The system of claim 3, wherein the processor further executes the shader component to determine the one or more edges to render based at least in part on the transformed position.

5. The system of claim 1, wherein the processor further executes the shader component to use a dot product to calculate a cosine of horizontal and vertical angles between the viewing vector and the normal vector to determine the thickness of the one or more edges.

6. The system of claim 5, wherein the processor further executes the shader component to modify a result of the dot product based at least in part on a scaling factor such that the thickness of the one or more edges is independent of the scale of the 2D object.

7. The system of claim 6, wherein the processor further executes the shader component to perform anti-aliasing in a single pass operation with the rendering of the one or more edges.

8. A computerized method for generating an object in a mixed reality space, the computerized method comprising:
    obtaining a two-dimensional (2D) object;
    determining a thickness and a visibility of one or more edges of the 2D object to be generated to emulate a three-dimensional (3D) thickness;
    generating a view angle dependent rim drawing of the 2D object having the emulated 3D thickness;

rendering the one or more edges with a transparency and color to emulate a lighting condition; and presenting the view angle dependent rim drawing of the 2D object in a mixed reality space.

9. The computerized method of claim 8, wherein the 2D object comprises a quad user interface (UI) element and further comprising performing an anti-aliasing render of the view angle dependent rim drawing in a same rendering operation as rendering one or more colors for one or more edges of the 2D object defined by the thickness.

10. The computerized method of claim 8, further comprising separately rendering a horizontal edge color and a vertical edge color of a horizontal edge and a vertical edge of the 2D object, respectively.

11. The computerized method of claim 8, further comprising transforming a camera world position to a local position of the 2D object in the mixed reality space.

12. The computerized method of claim 11, further comprising determining the one or more edges to render based at least in part on the transformed position.

13. The computerized method of claim 8, further comprising using a dot product to calculate a cosine of horizontal and vertical angles between a viewing vector and a normal vector for the 2D object to determine the thickness of the one or more edges.

14. The computerized method of claim 13, further comprising modifying a result of the dot product based at least in part on a scaling factor such that the thickness of the one or more edges is independent of the scale of the 2D object.

15. One or more computer storage media having computer-executable instructions for generating an object in a mixed reality space that, upon execution by a processor, cause the processor to at least:

obtain a two-dimensional (2D) object with four vertices;

determine a thickness of one or more edges of the 2D object to be generated, the thickness based at least in part on a viewing vector and a normal vector for the 2D object;

generate a rendered 2D object with the determined thickness, including rendering the one or more edges with one or more colors to emulate a lighting condition; and present the rendered 2D object in a mixed reality space.

16. The one or more computer storage media of claim 15 having further computer-executable instructions that, upon execution by a processor, cause the processor to at least render a horizontal edge color and a vertical edge color of a horizontal edge and a vertical edge of the rendered 2D object, respectively.

17. The one or more computer storage media of claim 15 having further computer-executable instructions that, upon execution by a processor, cause the processor to at least transform a camera world position to a local position of the 2D object in the mixed reality space.

18. The one or more computer storage media of claim 17 having further computer-executable instructions that, upon execution by a processor, cause the processor to at least determine the one or more edges to render based at least in part on the transformed position.

19. The one or more computer storage media of claim 15 having further computer-executable instructions that, upon execution by a processor, cause the processor to at least use a dot product to calculate a cosine of horizontal and vertical angles between the viewing vector and the normal vector to determine the thickness of the one or more edges, and modify a result of the dot product based at least in part on a scaling factor such that the thickness of the one or more edges is independent of the scale of the 2D object.

20. The one or more computer storage media of claim 19 having further computer-executable instructions that, upon execution by a processor, cause the processor to at least perform anti-aliasing in a single pass operation with the rendering of the one or more edges.

* * * * *